(12) United States Patent
Kim

(10) Patent No.: US 12,434,903 B2
(45) Date of Patent: Oct. 7, 2025

(54) BEVERAGE CONTAINER APPARATUS

(71) Applicant: SEALVINO, Incheon (KR)

(72) Inventor: Jeong Jun Kim, Gwacheon-si (KR)

(73) Assignee: SEALVINO, Incheon (KR)

( * ) Notice: Subject to any disclaimer, the term of this patent is extended or adjusted under 35 U.S.C. 154(b) by 187 days.

(21) Appl. No.: 18/491,289

(22) Filed: Oct. 20, 2023

(65) Prior Publication Data

US 2024/0043197 A1 Feb. 8, 2024

Related U.S. Application Data

(63) Continuation of application No. PCT/KR2022/019672, filed on Dec. 6, 2022.

(30) Foreign Application Priority Data

Apr. 11, 2022 (KR) .................. 10-2022-0044575

(51) Int. Cl.
*B65D 83/00* (2006.01)
*B65D 41/02* (2006.01)
(Continued)

(52) U.S. Cl.
CPC ........... *B65D 83/767* (2025.01); *B65D 41/02* (2013.01); *B65D 47/06* (2013.01); *B65D 81/263* (2013.01); *B65D 2205/04* (2013.01)

(58) Field of Classification Search
CPC ...... B65D 83/767; B65D 41/02; B65D 47/06; B65D 81/263; B65D 2205/04
See application file for complete search history.

(56) References Cited

U.S. PATENT DOCUMENTS 4,474,312 A * 10/1984 Donoghue ............. B65D 41/56
222/207
4,607,762 A * 8/1986 Zulauf .................. B65D 1/323
222/521

(Continued)

FOREIGN PATENT DOCUMENTS

JP 3033394 U 1/1997
KR 10-2010-0102014 A 9/2010
(Continued)

OTHER PUBLICATIONS

International Search Report issued in PCT/KR2022/019672; mailed Mar. 6, 2023.

*Primary Examiner* — Frederick C Nicolas
(74) *Attorney, Agent, or Firm* — Studebaker Brackett PLLC

(57) ABSTRACT

The present disclosure relates to a food and beverage container device including: a container for storing food and beverage, and a piston unit capable of moving up and down in close contact with the container. The piston unit includes a neck part having a hollow interior and movable up and down. The neck part includes a discharge portion protruding upward from an upper end of the neck part, having a first threaded portion and a first discharge groove on the outer circumferential surface, and discharging food and beverage or air to the inside of the container, a first flow guiding portion formed to be inclined upward in the opposite direction to the first discharge groove at a position spaced apart from the discharge portion, and a first reservoir portion formed between the discharge portion and the first flow guiding portion to hold the discharged food and beverage.

3 Claims, 9 Drawing Sheets

(51) Int. Cl.
  *B65D 47/06*    (2006.01)
  *B65D 81/26*    (2006.01)
  *B65D 83/767*   (2025.01)

(56) References Cited

U.S. PATENT DOCUMENTS

| | | | | |
|---|---|---|---|---|
| 5,224,632 | A * | 7/1993 | Murakami | G01F 11/286 |
| | | | | 222/207 |
| 5,381,930 | A * | 1/1995 | Kalabakas | G01F 11/286 |
| | | | | 222/205 |
| 6,168,050 | B1 * | 1/2001 | Battegazzore | B05B 11/1064 |
| | | | | 222/207 |
| 6,330,960 | B1 * | 12/2001 | Faughey | G01F 11/288 |
| | | | | 222/207 |
| 6,547,105 | B1 * | 4/2003 | Seelhofer | G01F 11/082 |
| | | | | 222/211 |
| 8,505,783 | B2 * | 8/2013 | Gill | A45F 3/20 |
| | | | | 215/388 |
| 9,120,112 | B2 * | 9/2015 | Wegener | G01F 11/028 |
| 10,591,337 | B1 * | 3/2020 | Neuhalfen | B05B 1/267 |
| 2011/0290826 | A1 | 12/2011 | Harris | |

FOREIGN PATENT DOCUMENTS

| | | |
|---|---|---|
| KR | 10-2205088 B1 | 1/2021 |
| KR | 10-2458153 B1 | 10/2022 |

\* cited by examiner

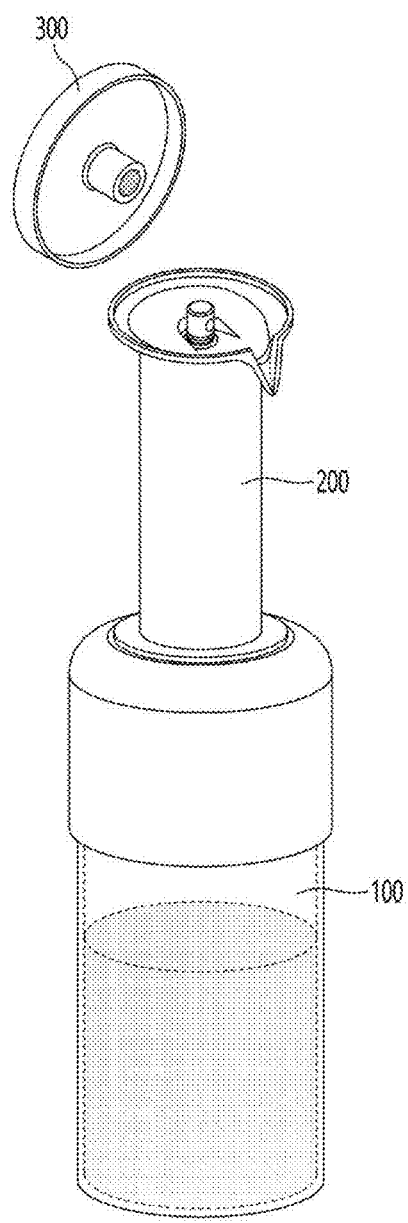
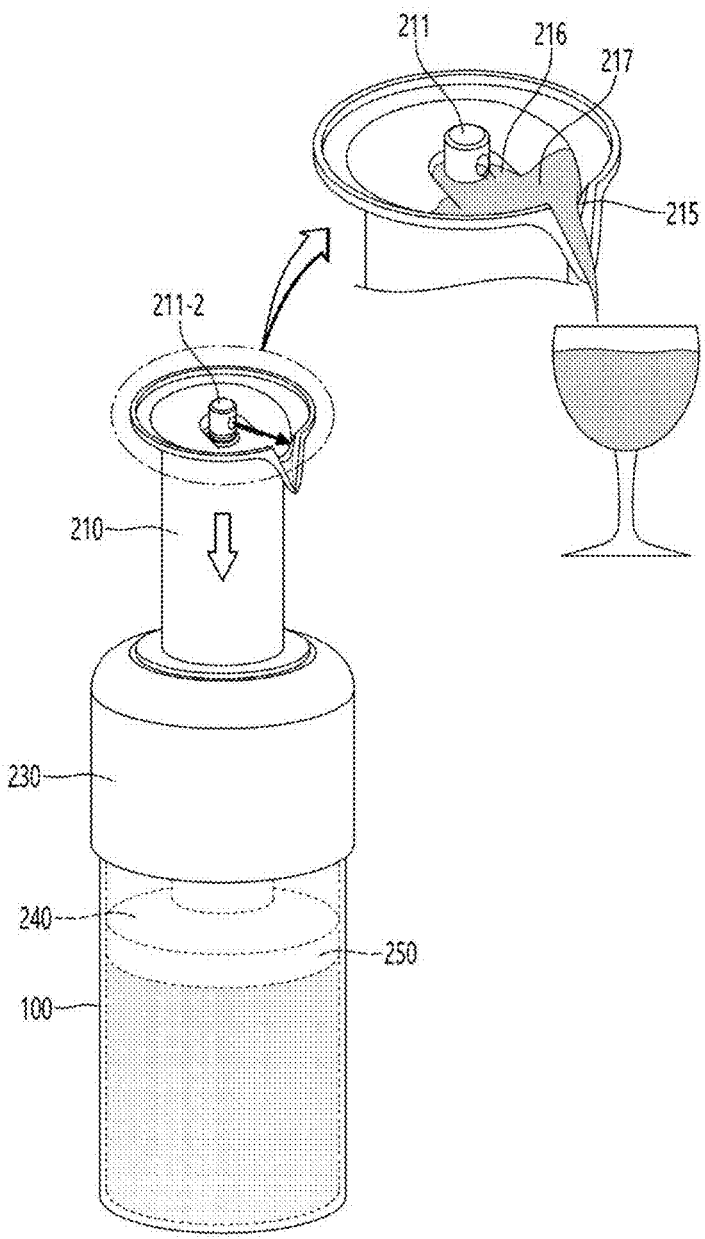
FIG. 8A
FIG. 8B

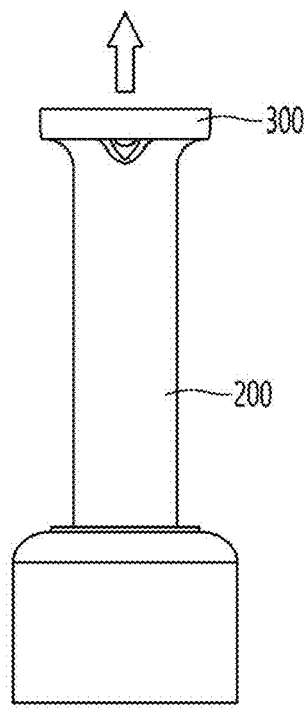
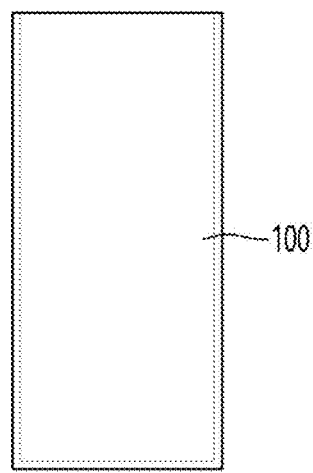
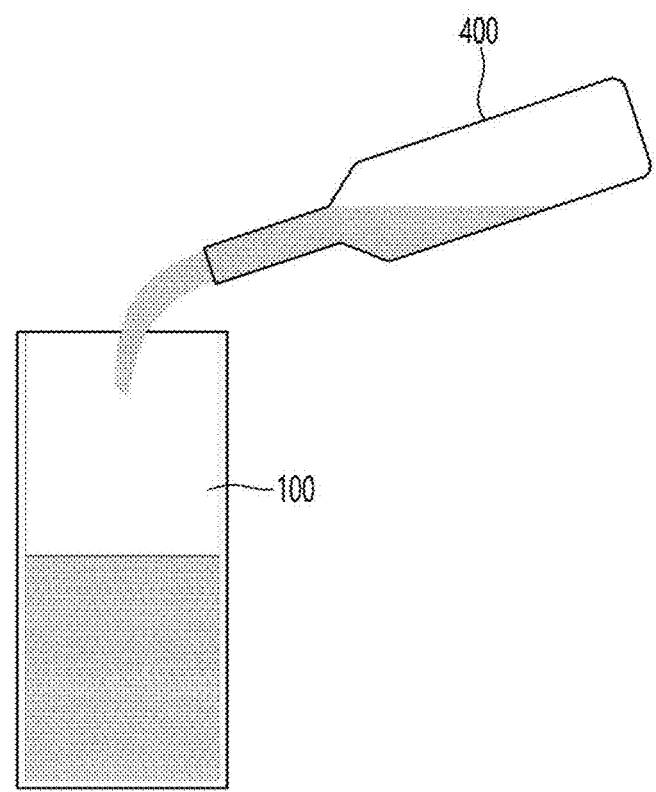
FIG. 9A        FIG. 9B

BEVERAGE CONTAINER APPARATUS

CROSS-REFERENCE TO RELATED APPLICATIONS

This application is a Continuation of International Application No. PCT/KR2022/019672, filed on Dec. 6, 2022, which claims priority under 35 U.S.C. § 119 of Korean Patent Application No. 10-2022-0044575, filed on Apr. 11, 2022, the entire contents of which are hereby incorporated by reference.

TECHNICAL FIELD

The present invention relates to a food and beverage container device for storing food and beverage such as wine or vinegar, which are easily deteriorated when exposed to air.

BACKGROUND ART

In general, wine is stored in a wine bottle, and a mouth of the wine bottle is sealed and packaged with a cap made of a material such as cork. When the cork is opened to drink the wine, the wine comes into contact with oxygen and is oxidized within a few hours to have a sour taste instead of an original taste of the wine.

Thus, drinking all the wine stored in the wine bottle quickly at the time of opening is the best way to experience the original taste of the wine. However, since the drinking of all of the wine at once is unrealistic, a method of storing the remaining wine to prevent the wine from being oxidized is required.

However, there is a problem in that the oxygen absorption member loses a preservation function when the wine bottle is laid down. Accordingly, there are additional problems such as inability to carry the bottle and inability to store the wine bottle laid down in a cellar. In particular, it is impossible to preserve the wine sensitive to temperature and ultraviolet rays when not stored in the cellar.

Also, in the related art, since the oxygen absorption member is a disposable product and has a short storage time, the oxygen absorption member is continuously replaced with a new oxygen absorption member and requires high costs.

DISCLOSURE OF THE INVENTION

Technical Problem

The present invention provides a food and beverage storage container capable of minimizing contact with air without purchasing an additional auxiliary material.

The present invention also provides a food and beverage storage container capable of preventing air introduced into the container.

The present invention also provides a food and beverage storage container capable of preventing air from being introduced into the container even when laid down and being stored in a cellar.

Technical Solution

Embodiments of the present invention provide a food and beverage container device including: a container configured to store food and beverage; and a piston unit configured to move in a vertical direction in close contact with an inner surface of the container. Here, the piston unit includes a neck part having a hollow interior and movable in the vertical direction, the neck part includes: a discharge portion protruding upward from an upper end of the neck part and having a first threaded portion and a first discharge groove on an outer circumferential surface thereof to discharge the food and beverage or air in the container; a first flow guiding portion formed to be inclined upward in a direction opposite to the first discharge groove at a position spaced apart from the discharge portion; and a first reservoir portion formed between the discharge portion and the first flow guiding portion to hold the discharged food and beverage.

Here, the neck part may include: a second flow guiding portion formed on a portion of an outer circumferential surface of an upper end of the neck part to be inclined upward; a flow prevention protrusion protruding upward from the second flow guiding portion; an outlet connected to the second flow guiding portion and formed on a portion of the outer circumferential surface of the upper end of the neck part to be inclined downward toward a front end; and a second reservoir portion formed between the outlet and the first flow guiding portion to hold the discharged food and beverage.

Here, a second discharge groove in communication with the first discharge groove may be formed at a lower end of the discharge portion, and the piston unit may include a discharge pipe that is a passage which is accommodated in the neck part and inserted and coupled to the second discharge groove and through which the food and beverage in the container move.

Here, the piston unit may include an inner cap accommodated in the neck part and having a groove at one end to which the discharge pipe is coupled.

Here, the piston unit may include a blocking cap inserted and coupled to the other end of the inner cap and having a fourth discharge groove at one end, in which a center of the fourth discharge groove is deviated from a center of the groove of the inner cap when the blocking cap is inserted and coupled to the inner cap.

Advantageous Effects

The present invention has the effect of allowing longer storage of the food and beverage such as wine that is easily deteriorated when contacts the air.

Also, the present invention has the effect of being completely sealed so that wine stored therein does not easily flow in a stored state and the effect of being portable and stored in a wine cellar.

Also, the present invention has the effect of minimizing contact with the air to secure the longer storage period regardless of the amount of the food and beverage stored therein.

Also, the present invention has the effect of minimizing contact with the air without purchasing the additional auxiliary material.

Also, the present invention has the effect of preventing the air from being introduced into the container although the device is laid down and allowing the device to be stored laid down in the cellar.

BRIEF DESCRIPTION OF THE DRAWINGS

FIGS. 6A-7B are usage conceptual views of storing food and beverage in a container and then discharging air according to an embodiment of the present invention.

FIGS. 8A-8B are usage conceptual views of discharging the food and beverage stored in the food and beverage container device according to an embodiment of the present invention.

FIGS. 9A-9B are usage conceptual views of storing food and beverage in a container according to another embodiment of the present invention.

MODE FOR CARRYING OUT THE INVENTION

Hereinafter, embodiments disclosed in this specification is described with reference to the accompanying drawings, and the same or corresponding components are given with the same drawing number regardless of reference number, and their duplicated description will be omitted. Furthermore, terms, such as a "module" ad a "unit", are used for convenience of description, and they do not have different meanings or functions in themselves. Moreover, detailed descriptions related to well-known functions or configurations will be ruled out in order not to unnecessarily obscure subject matters of the present disclosure. However, this does not limit the present disclosure within specific embodiments and it should be understood that the present disclosure covers all the modifications, equivalents, and replacements within the idea and technical scope of the present disclosure.

It will be understood that although the terms of first and second are used herein to describe various elements, these elements should not be limited by these terms. Terms are only used to distinguish one component from other components.

It will also be understood that when an element is referred to as being "connected to" or "engaged with" another element, it can be directly connected to the other element, or intervening elements may also be present. It will also be understood that when an element is referred to as being 'directly connected to' another element, there is no intervening elements.

The terms of a singular form may include plural forms unless referred to the contrary.

The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Figure 1:
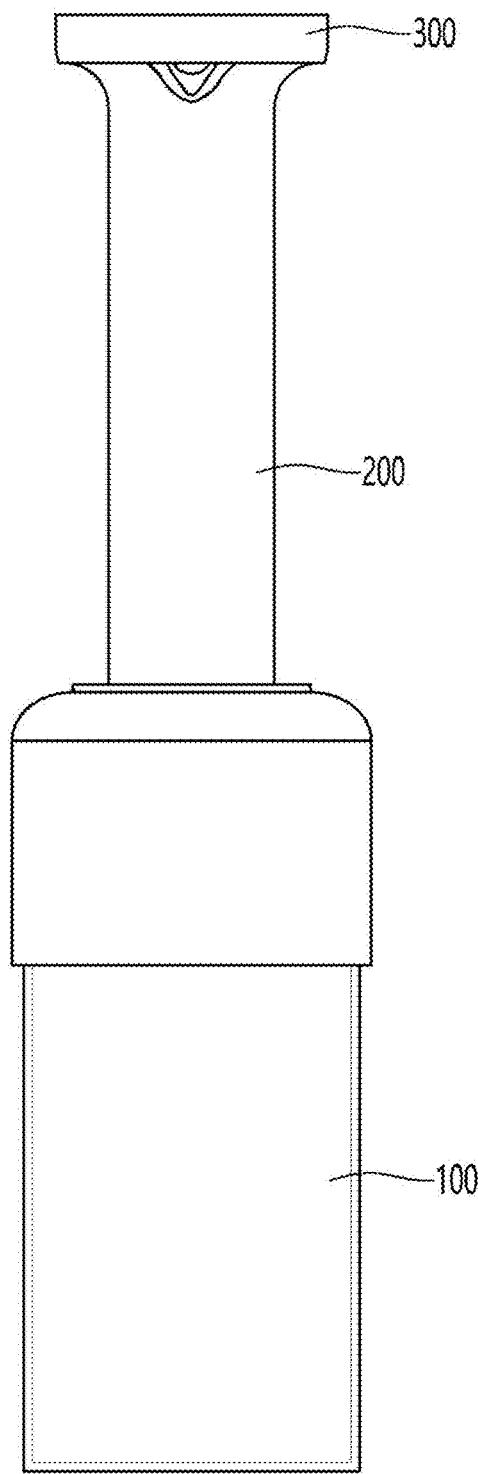
FIG. 1 is a front view of a food and beverage storage device according to an embodiment of the present invention.

FIG. 1 is a front view of a food and beverage storage device according to an embodiment of the present invention.

Referring to FIG. 1, a food and beverage storage device 10 includes a container 100, a piston unit 200, and a cap 300.

The container 100 may have an opened upper end and store food and beverage therein.

The piston unit 200 may move in a vertical direction in close contact with an inner surface of the container 100 to effectively remove air in the container 100 depending on an amount of remaining food or beverage.

The cap 300 is attached to and detached from the piston unit 200 from thereabove to prevent air from being introduced into the container 100.

Figure 2:
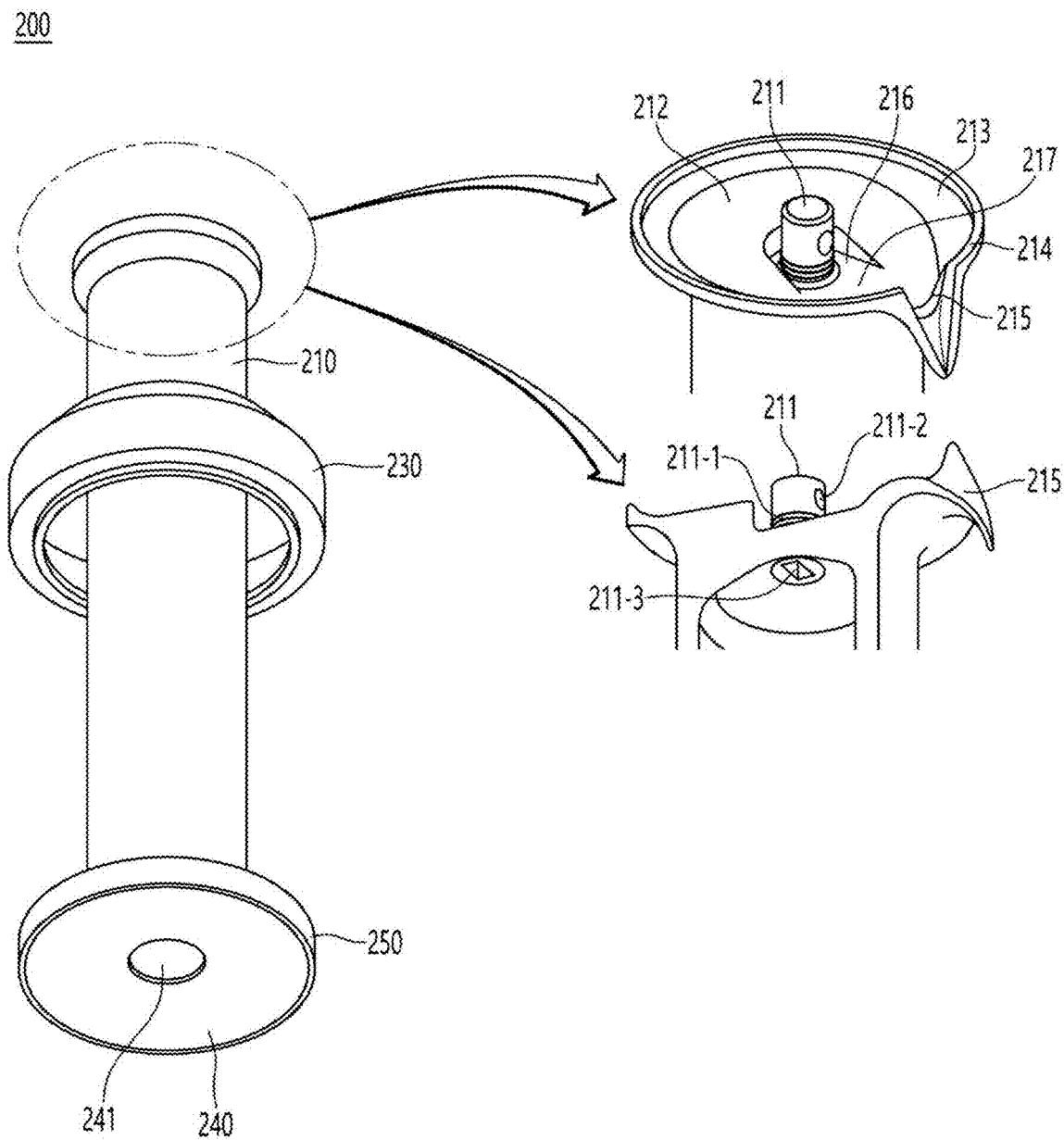
FIG. 2 is a configuration view of a piston unit according to an embodiment of the present invention.

FIG. 2 is a configuration view of the piston unit according to an embodiment of the present invention.

Figure 3:
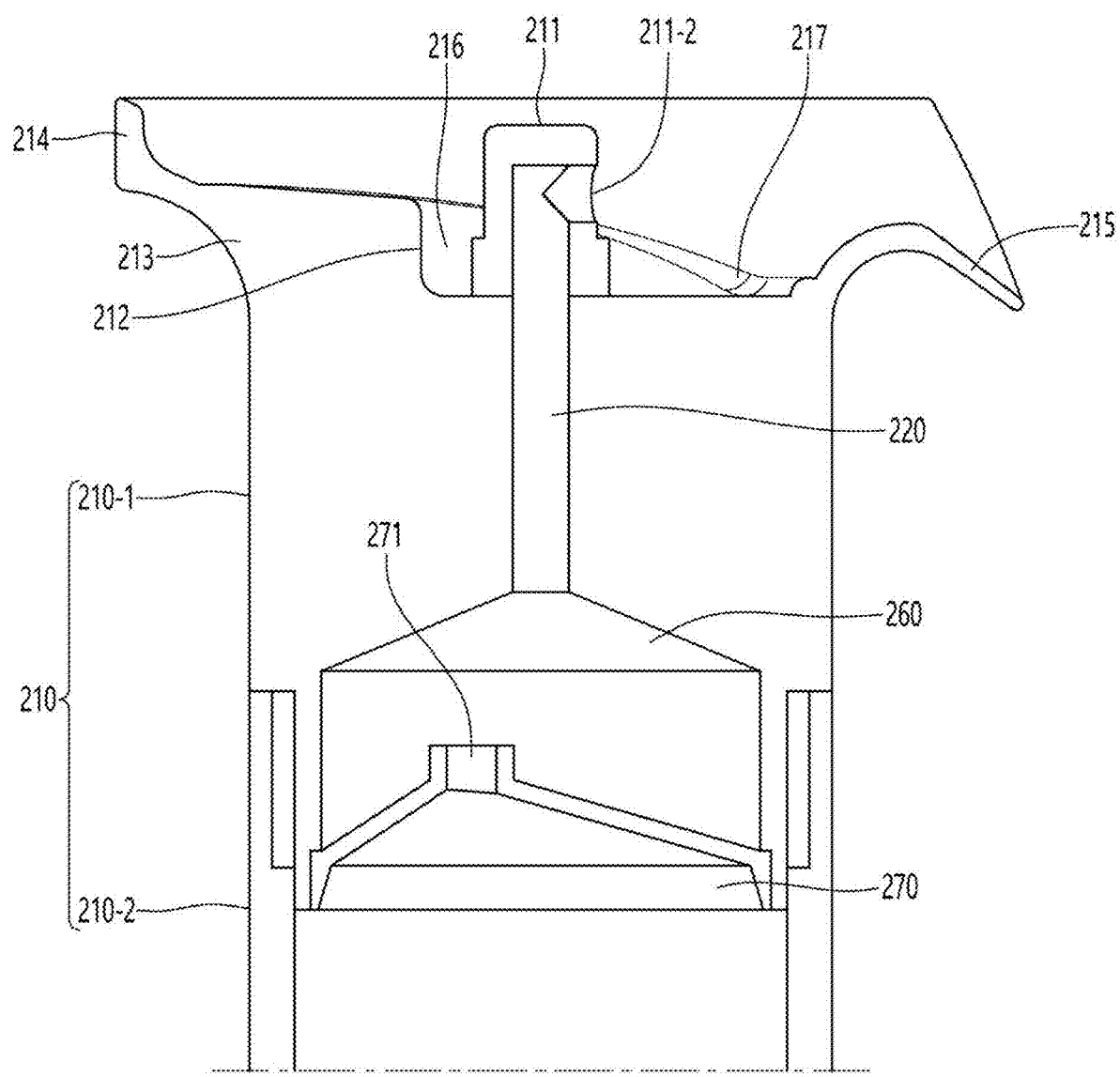
FIG. 3 is a view for explaining a neck part according to an embodiment of the present invention.

FIG. 3 is a view for explaining a neck part according to an embodiment of the present invention.

Figure 4:
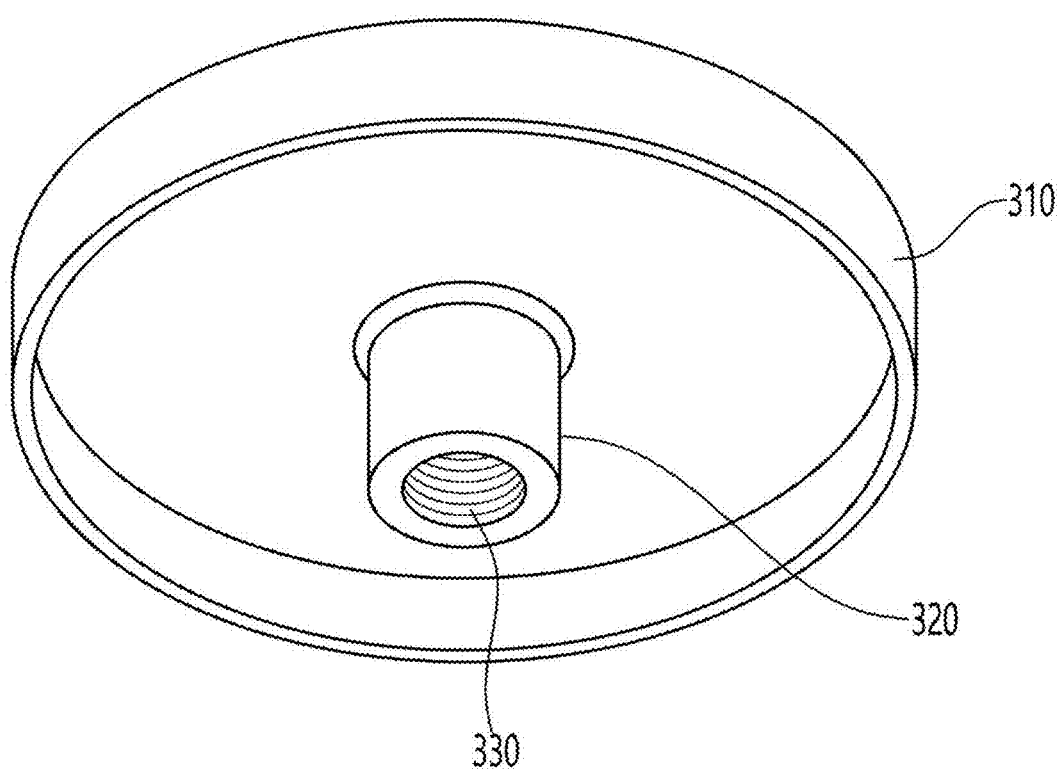
FIG. 4 is a configuration view of a cap according to an embodiment of the present invention.

FIG. 4 is a configuration view of the cap according to an embodiment of the present invention.

Figure 5:
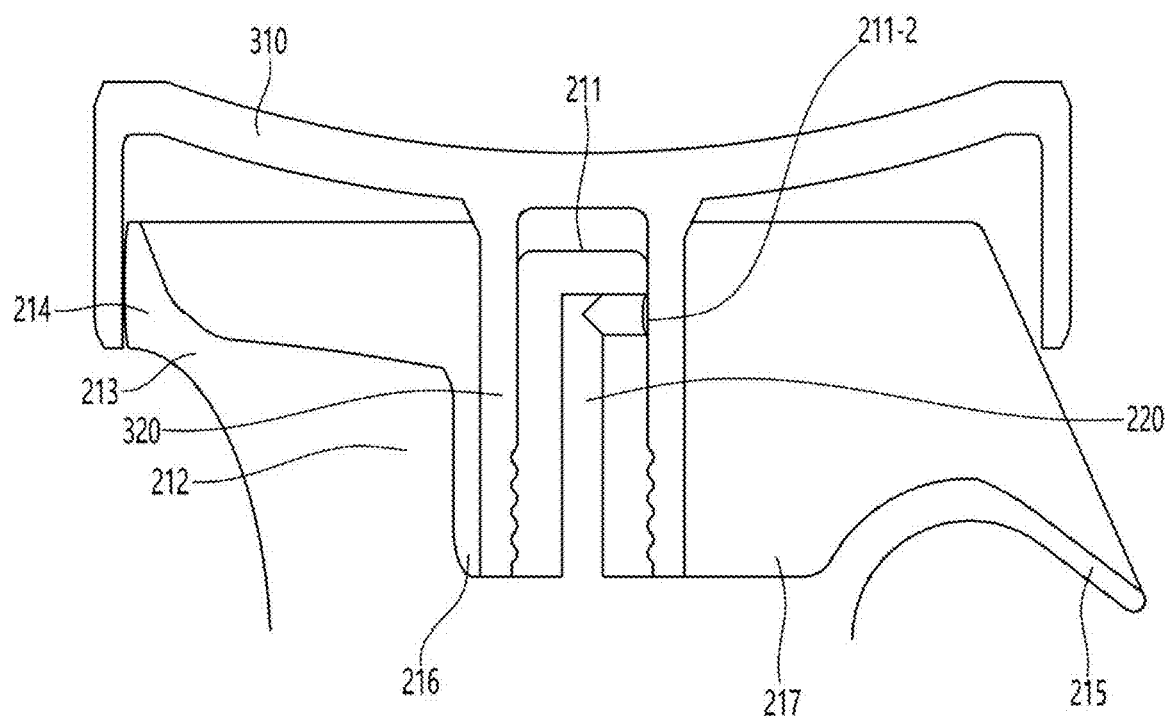
FIG. 5 is a usage conceptual view illustrating a state in which the cap is coupled to the piston unit according to an embodiment of the present invention.

FIG. 5 is a usage conceptual view illustrating a state in which the cap is coupled to the piston unit according to an embodiment of the present invention.

Referring to FIGS. 2 to 5, the piston unit 200 includes a neck part 210, a discharge pipe 220, a guide part 230, a lower end cap 240, a sealing part 250, an inner cap 260, and a blocking cap 270.

The neck part 210 has a hollow interior and moves in the vertical direction by a manipulation of a user to move to the inside and outside of the container 100. Also, the neck part 210 includes an upper neck part 210-1 and a lower neck part 210-2, which may be attached to and detached from each other because a thread is disposed on a portion of an outer circumferential surface of each of the upper neck part 210-1 and lower neck part 210-2. As a lower side of the thread of the upper neck part 210-1 is inserted into the lower neck part 210-2, the air or food and beverage moving through an empty space perforated in the lower neck part 210-2 from being discharged to a portion except for the blocking cap 270 and the inner cap 260 through a third discharge groove 241 of the lower cap 240.

The neck part 210 includes a discharge portion 211, a first flow guiding portion 212, a second flow guiding portion 213, a flow prevention protrusion 214, an outlet 215, a first reservoir portion 216, and a second reservoir portion 217.

The discharge portion 211 protrudes upward from an upper end of the neck part 210, preferably an upper end of the upper neck part 210-1, to discharge the food and beverage moving through the discharge pipe 220 or the air in the container 100.

Also, a first threaded portion 211-1 and a first discharge groove 211-2 are formed on an outer circumferential surface of the discharge portion 211, and a second discharge groove 211-3 is formed at a lower end of the discharge portion 211.

The first threaded portion 211-1 is coupled to and detached from the second threaded portion 330 of the cap 300. As the first threaded portion 211-1 is coupled to and detached from the second threaded portion 330, the discharge portion 211 is detached from a watertight portion 320 of the cap 300, so that the discharge portion 211 is exposed or blocked by the watertight portion 320.

The first discharge groove 211-2 is formed in a portion of the outer circumferential surface of the discharge portion 211, which corresponding to a direction of the discharge port 215, to discharge the food or beverage or air moving through the discharge pipe 220 and the second discharge groove 211-3.

The first discharge groove 211-2 has a diameter of 4 mm to 5 mm or less. When the first discharge groove 211-2 has a diameter less than 4 mm, there is a problem in that much time takes until the food and beverage is discharged through the discharge portion 215 because the food and beverage held by the first and second reservoir portions 216 and 217 have a height greater than that of the food and beverage discharged through the first discharge groove 211-2. This is because when the first discharge groove 211-2 has a diameter of 5 mm or more, strong discharge pressure occurs, so that the food and beverage discharged through the first discharge groove 211-2 flow over the outlet 215, i.e., the food and beverage is discharged directly to the outside of the food and beverage container device 10.

As the second discharge groove 211-3 is formed at the lower end of the discharge portion 211 to communication with the first discharge groove 211-2, one end of the discharge pipe 220 is inserted and coupled thereto.

The first flow guiding portion 212 is formed at the upper end of the neck part 210, preferably a position spaced apart from the discharge portion 211 of an upper end of the upper neck part 210-1, to be inclined upward in a direction opposite to the first discharge groove 211-2. The first flow guiding portion 212 guides the food and beverage discharged through the first discharge groove 211-2 and then flowing over at least one of the first reservoir portion 216 and the second reservoir portion 217 to move to at least one of the first reservoir portion 216 and the second reservoir portion 217.

The second flow guiding portion 213 is formed at the upper end of the neck part 210, preferably a portion of an outer circumferential surface of the upper end of the upper neck part 210-1, to be inclined upward. The second flow guiding portion 213 guides the food and beverage flowing over at least one of the first and reservoir portions 216 and 217 and the first flow guiding portion 212 to move to at least one of the first and reservoir portions 216 and 217 and the first flow guiding portion 212.

The flow prevention protrusion 214 protrudes upward from the second flow guiding portion 213 and prevents the food and beverage from flowing over the second flow guiding portion 213 to the outside. Here, the flow prevention protrusion 214 has a height of 2 mm or more.

The outlet 215 is connected to the second flow guiding portion 213 and formed at the upper end of the neck part 210, preferably at a portion of the outer circumferential surface of the upper end of the upper neck part 210-1, to be inclined downward toward a front end, thereby discharging the food and beverages to the outside. Here, the outlet 215 may have an inclined angle of about 25° and a length of 5 mm or more.

Specifically, the food and beverage discharged through the first discharge groove 211-2 are discharged to the second reservoir portion 217 and discharged to the outside through the outlet 215 when the food and beverage discharged after being held by the first and second reservoir portions 216 and 217 has a height greater than that of the outlet 215. Here, when the food and beverage held by the first and second reservoir portions 216 and 217 flow over at least one of the first and second flow guiding portions 212 and 213 because an amount of the food and beverage discharged through the first discharge groove 211-2 is greater than that discharged through the outlet 215, the food and beverages transferred to at least one of the first flow guiding portion 212 and the second flow guiding portion 213 by at least one of the inclined first and second flow guiding portions 212 and 213 are guided to move to at least one of the first and second reservoir portions 216 and 217. Also, the food and beverage overflowing to the second flow guiding portion 213 are blocked by the flow prevention protrusion 214 not to overflow to the outside and guided to move to at least one of the second reservoir portion 217 and the first flow guiding portion 212.

Since the food and beverage are discharged through the first discharge groove 211-2, held by the first and second reservoir portions 216 and 217, and then discharged to the outside through the outlet 215 when the discharged food and beverage has a height greater than that of the outlet 215, the user may eat or drink the food and beverage using a cup without tilting or flipping the food and beverage container device 10, and thus a problem, in which the air may be introduced into the food and beverage container device 10 when the food and beverage container device 10 is tilted or flipped, may be prevented. Also, although the amount of the food and beverage discharged through the first discharge groove 211-2 is large, the discharged food and beverage are guided to the first and second reservoir portions 216 and 217 and discharged to the outside through the outlet instead of overflowing to the outside.

The first reservoir portion 216 is formed between the discharge portion 211 and the first flow guiding portion 212, and the second reservoir portion 217 is formed between the discharge portion 211 and the outlet 215.

The first and second reservoir portions 216 and 217 are portions in which the food and beverage discharged through the first discharge groove 211-2 are held. In the food and beverage container device 10 according to a preferred embodiment of the present invention, the food and beverage discharged through the first discharge groove 211-2 are firstly discharged to and held by the first and second reservoir portions 216 and 217 instead of being directly discharged to the outside of the food and beverage container device 10, and then the discharged food and beverage are discharged to the outside when the discharged food and beverage has a height equal to or greater than that of the outlet 215. Here, the watertight portion 320 of the cap 300 may be inserted into the first reservoir 216 when coupled to the discharge portion 211.

The discharge pipe 220 is accommodated in the neck part 210, preferably in the upper neck portion 210-1, and has one end coupled to the second discharge groove 211-3 and the other end coupled to the inner cap 260 to serve as a passage allowing the food and beverage contained in the container or the air in the container to move to the first discharge groove 211-2 through the third discharge groove 241. Here, when a portion of the one end of the discharge pipe 220 is inserted into the second discharge groove 211-3, the portion may be connected to the first discharge groove 211-2. That is, the discharge pipe 220 may be inserted into the discharge portion 211.

When the discharge pipe 220 has a circular shape, the second discharge groove 211-3 may have a rectangular shape as illustrated in FIG. 2. However, the embodiment of the present invention is not limited thereto. For example, the second discharge groove 211-3 may have a circular shape. Also, when the discharge pipe 220 has a circular shape, the discharge pipe 220 has a diameter of 4 mm to 5 mm or less and a length of 5 mm to 40 mm or less.

An experiment has been conducted in such a manner that air is introduced into the container 100 through the discharge pipe 220 according to the diameter and length of the discharge pipe 220 when the container 100 of the food and beverage container device 10 is filled with 650 ml of water and the food and beverage container device 10 is turned over. As a result of the experiment, there is a problem in that when the discharge pipe 220 has a diameter of 6 mm or more, the air is introduced into the container 100 through the discharge pipe 220 regardless of the length of the discharge pipe 220, and the food and beverage in the container 100 are discharged. Also, in case that the discharge pipe 220 has a diameter of 5 mm or less, the air is introduced into the container 100 through the discharge pipe 220 when the discharge pipe 220 has a diameter less than 5 mm, and the air is not introduced into the container 100 through the discharge pipe 220 when the discharge pipe 220 has a diameter less than 5 mm or more. Also, there is a problem in which the food and beverage are not discharged through the first discharge groove 211-2 because pressure in the container 100 is less than that outside the container when the discharge pipe 220 has a diameter of 4 mm or less or has a length of 40 mm or more, specifically a problem in which since an amount of food and beverage discharged through the first discharge groove 211-2 is too small, much time takes until the food and beverage held by the first and second reservoir portions 216 and 217 has a height equal to or greater than that of the discharge portion.

Accordingly, it may be confirmed that when the discharge pipe 220 has a diameter of 4 mm to 5 mm or less and a length of 5 mm to 40 mm or less, the food and beverage are discharged through the first discharge groove 211-2, and external air is prevented from being introduced into the container 100 through the discharge pipe 220.

Also, a preferred embodiment of the present invention suggests that when the discharge pipe 220 has a rectangular cross-sectional shape, the second discharge groove 211-3 has a rectangular cross-sectional shape as illustrated in FIG. 2, and a diagonal length of the cross-section of the discharge pipe 220 is 4 mm to 5 mm or less. The above-described suggestion is made because of a problem in which when the cross-section of the discharge pipe 220 has a diagonal length less than 4 mm to reduce a surface area in case of the air, the air in the container 100 is caught by the discharge pipe 220 and is unable to move through the discharge pipe 220, and thus the air is unable to escape to the outside through the first discharge groove 211-1. On the contrary, when the cross-section of the discharge pipe 220 has a diagonal length of 5 mm or more, the air introduced through the first discharge groove 211-2 may be introduced into the inner cap 260 through the discharge pipe 220 and then into the container 100.

Also, a preferred embodiment of the present invention suggests that when the discharge pipe 220 has a triangular cross-sectional shape, the second discharge groove 211-3 has a triangular cross-sectional shape, and a diagonal length of the cross-section of the discharge pipe 220 is 4 mm to 5 mm or less. The above-described suggestion is made because of a problem in which when the cross-section of the discharge pipe 220 has a diagonal length less than 4 mm to reduce the surface area in case of the air, the air in the container 100 is caught by the discharge pipe 220 and is unable to move through the discharge pipe 220, and thus the air is unable to escape to the outside through the first discharge groove 211-1. On the contrary, when the cross-section of the discharge pipe 220 has a diagonal length of 5 mm or more, the air introduced through the first discharge groove 211-2 may be introduced into the inner cap 260 through the discharge pipe 220 and then into the container 100.

The guide portion 230 is fixed to the upper end of the container 100 and has a hole formed in a center thereof, through which the neck part 210 passes, to serve to guide the neck part 210 when the neck part 210 slides in the vertical direction.

The lower end cap 240 is coupled to the lower end of the neck 210, preferably the lower end of the lower neck portion 210-2, and has a third discharge groove 241 formed in a center thereof, so that the food and beverage in the container 100 or the air in the container 100 move through the neck 210, preferably the empty space of the lower neck part 210-2. Here, the lower end cap 240 may be integrated with the lower end of the neck part 210, preferably the lower end of the lower neck portion 210-2.

The sealing part 250 is coupled to an outer circumferential surface of the lower end cap 240 while being in close contact with the inner surface of the container 100 to prevent the food and beverage from leaking out of the container 100. To this end, the sealing part 250 may be made of a material such as silicone or rubber and maintained in close contact with the inner surface of the container 100.

The inner cap 260 is inserted into and accommodated in the neck part 210, preferably the upper neck part 210-1, and has a hollow interior. The inner cap 260 has one end in which a groove is defined so that the discharge pipe 220 is coupled thereto and the other end to which the blocking cap 270 is inserted and coupled. Also, since the inner cap 260 has an empty space although the blocking cap 270 is inserted and coupled thereto, the food and beverage in the container 100 or the air in the container 100 moving through the empty space of the neck part 210, preferably the lower neck part 210-2, are discharged through a fourth discharge groove 271 of the blocking cap 270, stored in the empty space of the inner cap 260, and then move through the discharge pipe 220 connected to the one end.

The blocking cap 270 that is made of rubber or silicone is inserted and coupled to the other end of the inner cap 260 and disposed between the upper neck part 210-1 and the lower neck part 210-2 to prevent the air or beverage from leaking through a gap therebetween. The fourth discharge groove 271 that has a diameter of 2 mm or more and is inclined upward from both ends of the other end of the blocking cap 270 is formed at one end inserted into the other end of the inner cap 260, a groove is formed in a lower portion of the other end, and the inside is empty. Here, the fourth discharge groove 271 of the blocking cap 270 is formed at a deviated position instead of corresponding to a center of the groove to which the discharge pipe 220 of one end of the inner cap 260 is coupled when the blocking cap 270 is inserted and coupled to the inner cap 260. That is, a center of the fourth discharge groove 271 is deviated from the center of the groove of the inner cap 260. As described above, the fourth discharge groove 271 is formed at the position that is deviated from the center of the groove of the discharge pipe 220 to confine the air introduced through the discharge pipe 220 in the empty space of the inner cap 260 instead of being introduced into the container 100. Specifically, when the air introduced into the empty space of the inner cap 260 through the discharge pipe 220 descends toward the container 100, the introduced air moves to a upwardly inclined portion of the fourth discharge groove 271 and is confined in the empty space of the inner cap 260 instead of being introduced into the fourth discharge groove 271 because the center of the fourth discharge groove 271 is deviated from the center of the groove of the inner cap 260. Thus, although the food and beverage container device 10 is tilted or turned over to discharge the food and beverage, the air introduced into the empty space of the inner cap 260 through the discharge pipe 220 may not move toward the container 100.

Also, the fourth discharge groove 271 is formed at the deviated position that does not correspond to the center of the groove of the discharge pipe 220 to discharge the air confined in the empty space of the inner cap 260 through the first discharge groove 211-2 when the food and beverage is discharged through the fourth discharge groove 271. Specifically, when the center of the fourth discharge groove 271 coincides with the center of the inner cap 260 groove, only the food and beverage pass through the discharge pipe 220 coupled to the groove of the inner cap 260 and are directly discharged through the first discharge groove 211 by pressure, and the air confined in the empty space of the inner cap 260 other than the fourth discharge groove 271 remains confined in the empty space of the inner cap 260. On the other hand, when the center of the fourth discharge groove 271 is deviated from the center of the inner cap 260 groove as in an preferred embodiment of the present invention, the food and beverage discharged to the fourth discharge groove 271 are discharged into the empty space of the inner cap 260, pass through the discharge pipe 220 coupled to the groove of the inner cap 260, and then discharged through the first discharge groove 211-2 together with the air confined in the empty space of the inner cap 260. Although not shown in FIG. 3, since a handle is disposed on the other end of the blocking cap 270, the user may conveniently separate the blocking cap 270.

The cap 300 is attached to and detached from the upper end of the neck 210 from thereabove to prevent the air from being introduced into the container 100. The cap 300 includes a housing 310, a watertight portion 320, and a second threaded portion 330. The housing 310 has a closed upper end and an opened lower end. The housing 310 accommodates and covers the discharge portion 211, the first flow guiding portion 212, the second flow guiding portion 213, the flow prevention protrusion 214, the first reservoir portion 216, and the second reservoir portion 217, which are formed on the upper end of the neck part 210 except for the outlet 215.

The watertight portion 320 protrudes from a portion of a bottom surface of the housing 310. The watertight portion 320 moves vertically downward toward the discharge portion 211 from thereabove when the piston unit 200 is coupled to the cap 300 and is inserted into the first reservoir portion 216 to block the discharge portion 211, thereby preventing external air from being introduced into the container 100 through the discharge portion 211 and the food and beverage from being discharged to the outside through the outlet. Although not shown in the drawing, an O-ring made of rubber or silicon is further coupled between the watertight portion 320 and the discharge portion 211 to prevent the external air from being introduced into the container 100 through the discharge portion 211 together with the watertight portion 320 and prevent the food and beverage in the container 100 from being discharged to the outside through the outlet 211 together with the watertight portion 320. When the watertight portion 320 is inserted and coupled to the discharge portion 211, an extra space of 2 mm or more may exist between the watertight portion 320 and the discharge portion 211.

The second threaded portion 330 is formed on an inner circumferential surface of the watertight portion 320 and is attached to and detached from the first threaded portion 211-1 to allow the discharge portion 211 to be attached to and detached from the watertight portion 320.

FIGS. 6A-7B are usage conceptual views of storing the food and beverage in the container and then discharging the air according to an embodiment of the present invention.

Figures 6A, 6B:
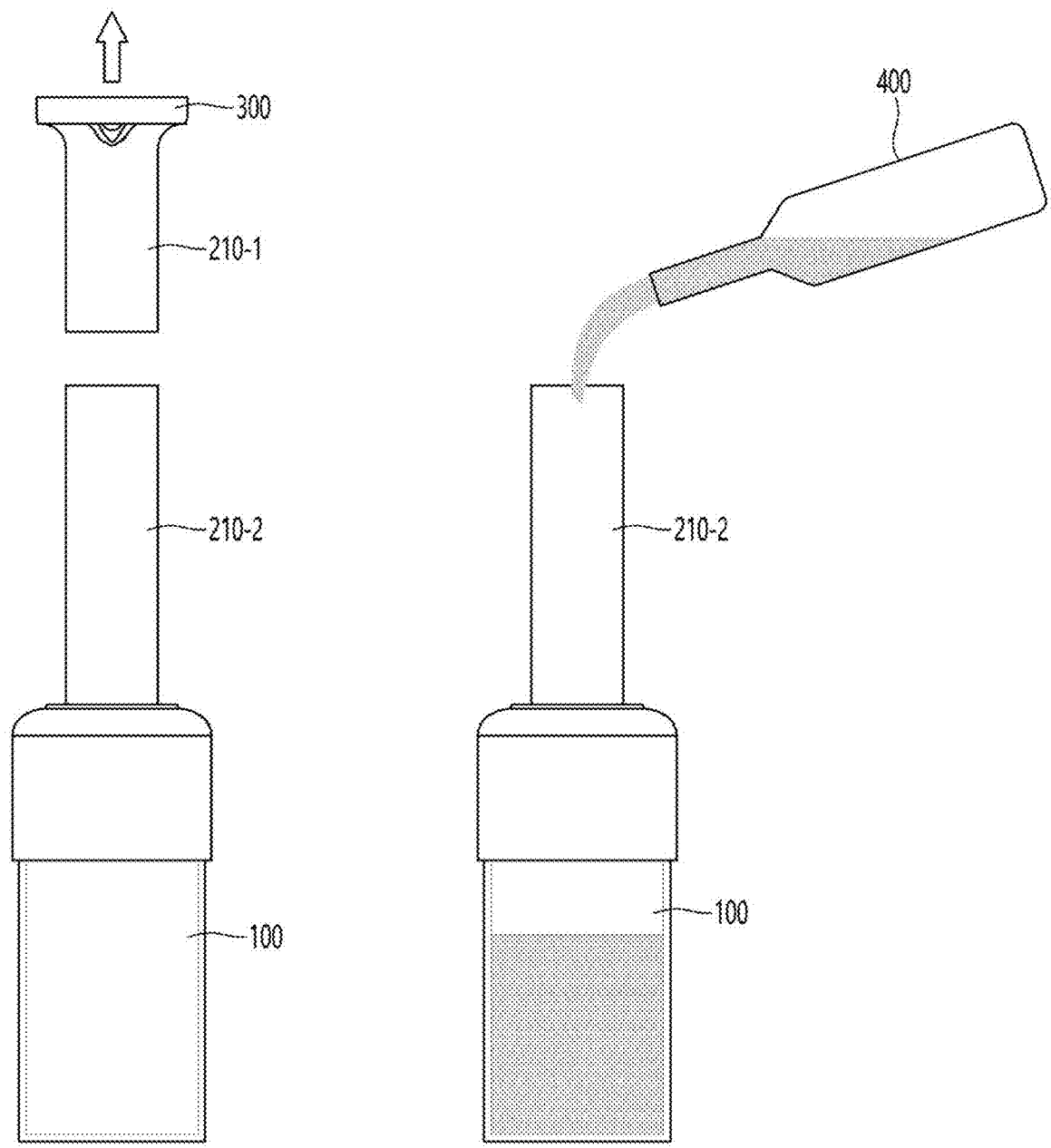

The upper neck part 210-1, the discharge pipe 220, the inner cap 260, the blocking cap 270, and the cap 300 are removed from the empty food and beverage storage device 10 (refer to FIG. 6A), and then the food and beverage stored in another container 400 is poured into the empty container 100 through the lower neck part 210-2 (refer to FIG. 6B).

Figure 7A:
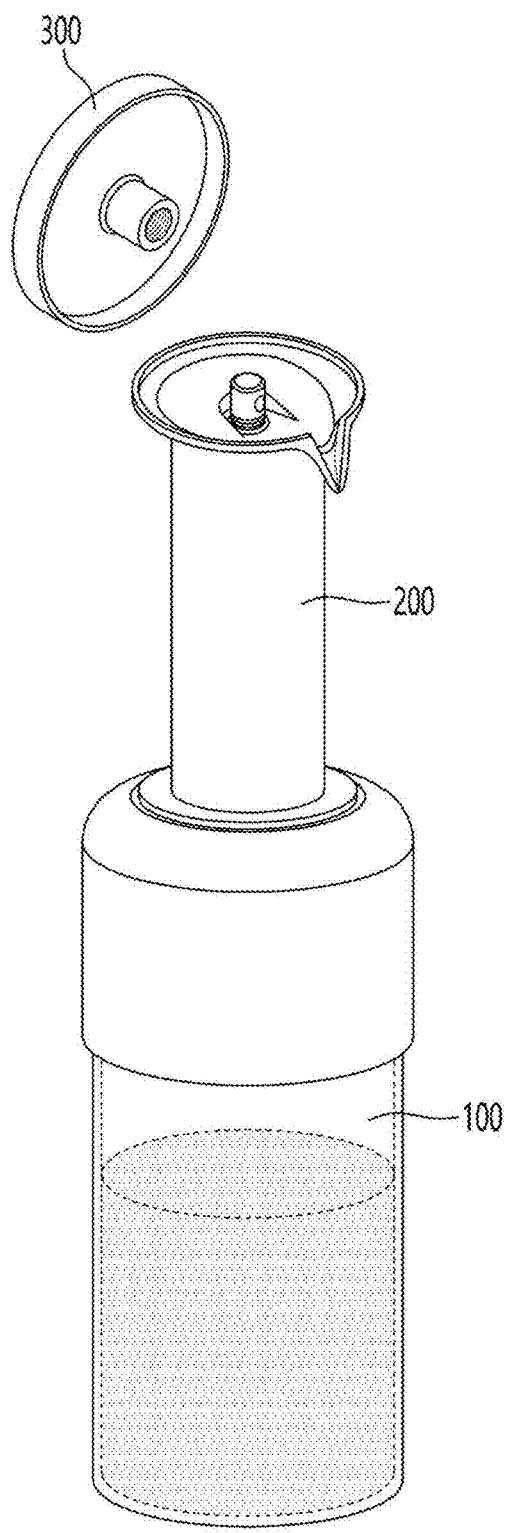
Figure 7B:
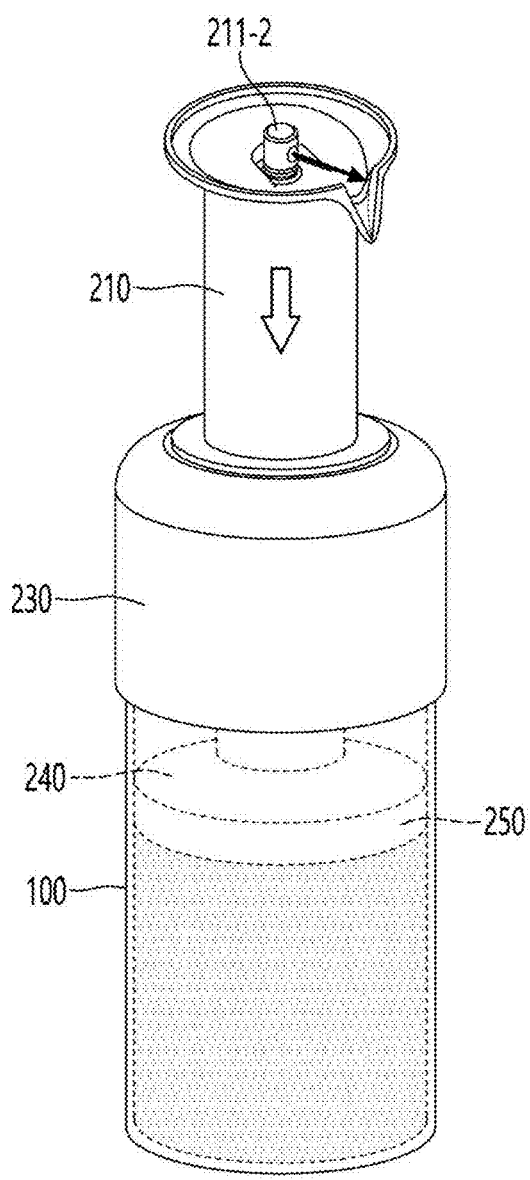

The upper neck part 210-1, the discharge pipe 220, the inner cap 260, and the blocking cap 270 are coupled to the lower neck part 210-2 as illustrated in FIG. 7A, and then the cap 300 is detached from the piston unit 200. Also, as illustrated in FIG. 7B, the air is discharged by pressing the piston unit 200 downward. Specifically, when the user holds and moves the neck part 210 downward, while the lower end cap 240 and the sealing part 250 move downward, the air existing in the container 100 moves until the first discharge groove 211-2 through the third discharge groove 241 and the discharge pipe 220 by pressure in the container 100 and then is discharged to the outside. After all the air is discharged, the cap 300 is coupled to the piston unit 200 to prevent the external air from being introduced into the container 100 through the discharge portion 211.

FIGS. 8A-8B are usage conceptual views of discharging the food and beverage stored in the food and beverage container device according to an embodiment of the present invention.

As illustrated in FIG. 8A, the cap 300 is detached from the piston unit 200 to expose the discharge portion 211 to the outside. Also, as illustrated in FIG. 8B, the food and beverage is discharged to the outside of the discharge portion 211 by pressing the piston unit 200 downward. Specifically, when the user holds and moves the neck part 210 downward, while the lower end cap 240 and the sealing part 250 move downward, the food and beverage stored in the container 100 move until the first discharge groove 211-2 through the third discharge groove 241 and the discharge pipe 220 by the pressure in the container 100 and then are discharged to the outside through the first discharge groove 211-2. Thereafter, the food and beverage discharged through the first discharge groove 211-2 are discharged to the second reservoir portion 217 and discharged to the outside through the outlet 215 when the food and beverage discharged after being held by the first and second reservoir portions 216 and 217 has a height greater than that of the outlet 215. Here, the food and beverage stored in the container 100 may be discharged through the lower neck part 210-2 by removing the upper neck part 210-1, the discharge pipe 220, the inner cap 260, the blocking cap 270, and the cap 300 and then tilting the container 100.

FIGS. 9A-9B are usage conceptual views of storing food and beverage in a container according to another embodiment of the present invention.

The piston unit 200 and the cap 300 are removed from the container 100 of the empty food and beverage storage device 10 (refer to FIG. 9A), and then the food and beverage contained in another container 400 is poured into the empty container 100. (Refer to FIG. 9B).

Although the food and beverage container device according to the present invention has been described with reference to the specific embodiments, it is not limited thereto. Therefore, it will be readily understood by those skilled in the art that various modifications and changes can be made thereto without departing from the spirit and scope of the present invention defined by the appended claims. Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

DESCRIPTION OF THE SYMBOLS

100: Container
200: Piston unit
300: Cap
The invention claimed is:
1. A food and beverage container device comprising:
a container configured to store food and beverage; and a piston unit configured to move in a vertical direction in close contact with an inner surface of the container, wherein the piston unit comprises a neck part having a hollow interior and movable in the vertical direction, the neck part comprises:

a discharge portion protruding upward from an upper end of the neck part and having a first discharge groove in an outer circumferential surface to discharge the food and beverage or air in the container;

a first flow guiding portion formed to be inclined upward in a direction opposite to the first discharge groove at a position spaced apart from the discharge portion;

a second flow guiding portion formed on a portion of an outer circumferential surface of the upper end of the neck part to be inclined upward;

a flow prevention protruding upward from the second flow guiding portion;

an outlet connected to the second flow guiding portion and formed on a portion of the outer circumferential surface of the upper end of the neck part to be inclined downward toward a front end; and a second reservoir portion formed between the outlet and the first flow guiding portion to hold the discharged food and beverage.

2. The food and beverage container device of claim 1, wherein the neck part comprises a first reservoir portion formed between the discharge portion and the first flow guiding portion to hold the discharged food and beverage.

3. A food and beverage container device comprising:

a container configured to store food and beverage; and a piston unit configured to move in a vertical direction in close contact with an inner surface of the container, wherein the piston unit comprises a neck part having a hollow interior and movable in the vertical direction, the neck part comprises a discharge portion protruding upward from an upper end of the neck part and having a first discharge groove in an outer circumferential surface and a second discharge groove in communication with the first discharge groove in a lower end thereof to discharge the food and beverage or air in the container, the piston unit further comprises:

a discharge pipe that is a passage which is accommodated in the neck part and inserted and coupled to the second discharge groove and through which the food and beverage in the container move;

an inner cap having a groove at one end to which the discharge pipe is coupled; and a blocking cap inserted and coupled to the other end of the inner cap and having a fourth discharge groove at one end, wherein a center of the fourth discharge groove is deviated from a center of the groove of the inner cap when the blocking cap is inserted and coupled to the inner cap.

* * * * *